US012292862B2

United States Patent
Iskender et al.

(10) Patent No.: US 12,292,862 B2
(45) Date of Patent: *May 6, 2025

(54) SCHEMA CHANGE OPERATIONS

(71) Applicant: Salesforce, Inc., San Francisco, CA (US)

(72) Inventors: Gokcen Iskender, Redmond, WA (US); Kadir Ozdemir, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,819

(22) Filed: Sep. 25, 2023

(65) Prior Publication Data

US 2024/0020281 A1 Jan. 18, 2024

Related U.S. Application Data

(63) Continuation of application No. 17/460,495, filed on Aug. 30, 2021, now Pat. No. 11,809,386.

(51) Int. Cl.
*G06F 16/20* (2019.01)
*G06F 16/21* (2019.01)
*G06F 16/23* (2019.01)

(52) U.S. Cl.
CPC ........ *G06F 16/211* (2019.01); *G06F 16/2379* (2019.01)

(58) Field of Classification Search
CPC ... G06F 16/211; G06F 16/213; G06F 16/2379
USPC ....................................................... 707/803
See application file for complete search history.

(56) References Cited

U.S. PATENT DOCUMENTS

| | | | |
|---|---|---|---|
| 6,072,799 A | 6/2000 | Cheung et al. | |
| 6,128,283 A | 10/2000 | Sabaa et al. | |
| 6,389,016 B1 | 5/2002 | Sabaa | |
| 6,915,354 B1 | 7/2005 | Ozdemir | |
| 6,993,635 B1 | 1/2006 | Gazit | |

(Continued)

OTHER PUBLICATIONS

IBM FileNet P8 Platform at https://www.ibm.com/docs/en/filenet-p8-platform/5.2.1?topic=vwtool-logical-vs-physical-table-names; opyright IBM Corporation; last updated: Oct. 2015; 1 page.

*Primary Examiner* — Vincent F Boccio
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed in which a computer system implements schema changes for existing database objects by maintaining a logical name and a current physical name corresponding to an existing database object, where the logical name points to the current physical name. The system receives a schema change request specifying the logical name and format changes for the existing object. The system performs a schema change operation in response to the request, including: creating a new database object having a new physical name, copying and transforming data from the existing object to the new object according to the format changes, mirroring new writes directed to the logical name to both the existing and new objects, and causing the logical name to point to the new physical name instead of the current physical name after completing the copying. The system responds to subsequent queries, specifying the logical name, from the new object.

20 Claims, 9 Drawing Sheets

(56) References Cited

U.S. PATENT DOCUMENTS

| | | | |
|---|---|---|---|
| 7,085,883 | B1 | 8/2006 | Dalgic |
| 7,334,105 | B2 | 2/2008 | Ozdemir |
| 8,135,928 | B2 | 3/2012 | Ozdemir |
| 8,285,956 | B2 | 10/2012 | Ozdemir |
| 8,423,733 | B1 | 4/2013 | Ozdemir |
| 8,689,052 | B2 | 4/2014 | Prophete et al. |
| 8,732,217 | B2 | 5/2014 | Mamidi et al. |
| 8,745,002 | B2 | 6/2014 | Ozdemir et al. |
| 8,862,818 | B1 | 10/2014 | Ozdemir |
| 8,862,858 | B1 | 10/2014 | Ozdemir |
| 9,110,919 | B2 | 8/2015 | Mamidi et al. |
| 9,128,823 | B1 | 9/2015 | Shilane et al. |
| 9,405,481 | B1 | 8/2016 | Cohen et al. |
| 9,535,800 | B1 | 1/2017 | Natanzon et al. |
| 9,740,422 | B1 | 8/2017 | Ozdemir |
| 10,380,094 | B2 | 8/2019 | Warshavsky et al. |
| 11,809,386 | B2 * | 11/2023 | Iskender ............... G06F 16/213 |
| 2006/0041580 | A1 | 2/2006 | Ozdemir et al. |
| 2006/0294159 | A1 | 12/2006 | Dettinger et al. |
| 2007/0220022 | A1 | 9/2007 | Lankinen et al. |
| 2008/0301162 | A1 | 12/2008 | Wall et al. |
| 2012/0246738 | A1 | 9/2012 | Shah et al. |
| 2018/0096165 | A1 | 4/2018 | Warshavsky et al. |
| 2019/0227997 | A1 | 7/2019 | Balzer |

\* cited by examiner

SCHEMA CHANGE OPERATIONS

PRIORITY CLAIM

The present application is continuation of U.S. application Ser. No. 17/460,495, entitled "Schema Change Operations," filed Aug. 30, 2021, the disclosure of which is incorporated by reference herein in its entirety.

BACKGROUND

Technical Field

This disclosure relates generally to database systems and, more specifically, to managing changes to databases such as schema changes.

Description of the Related Art

Modern database systems routinely implement management systems that enable users to store a collection of information in an organized manner that can be efficiently accessed and manipulated. In some cases, these database systems maintain database objects in the database for many different users accessing the database via applications. During operation, a database system receives requests to perform database transactions to manipulate and store information in the database. As such, those transactions can involve reading database records out of the database and writing new database records to the database. In some cases, these users may wish to make changes to the schema of objects (e.g., a table, index, etc.) in the database, i.e., changes to the metadata of the database; however, such changes may result in interruption of database availability.

DETAILED DESCRIPTION

Figure 1:
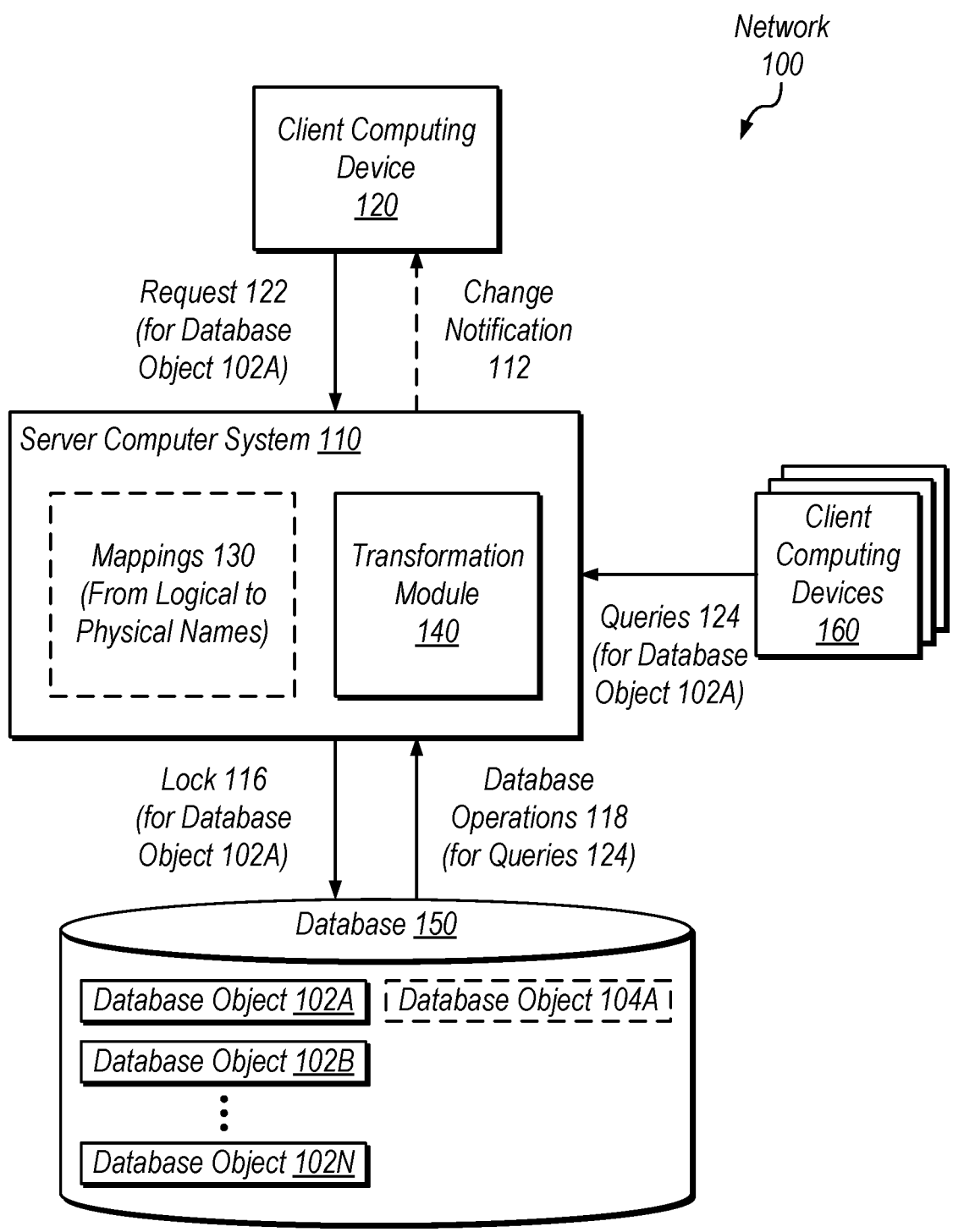
FIG. 1 is a block diagram illustrating example elements of a network that includes a server system configured to execute schema change operations on existing database objects, according to some embodiments.

Traditional database systems do not allow for multiple changes to be made to a schema of a database table (e.g., altering row keys, column type, storage format, etc.) while keeping the table live. For example, traditional database systems do not allow database queries to be performed on a database table while schema changes are being made to the table. Further, to the extent that traditional database systems provide for a single live schema change, these systems do not guarantee data consistency for database queries serviced during the schema changes. For example, if a database query were to request data from a table currently being altered according to a schema change, the data served from this table may be outdated (e.g., is not the most recent version of data).

The disclosed techniques are generally related to handling requests for multiple changes to schemas of database objects while keeping the objects active e.g., serving queries during the multiple schema changes. For example, multiple changes may be made to the format data stored in a database object. This provides for table updates including major schema changes without restricting access to a table during the alterations and providing consistent data during the table alteration. For example, the disclosed techniques do not mix and match data formats from the old and new table when servicing database queries. The disclosed techniques accomplish this by keeping the logical table name, which is visible to client devices, for an existing table the same and generating a new table on the backend (clients cannot yet see the name of the new table). Clients accessing the existing database table will not see the physical table name, but will see the logical table name that currently points to the existing table. Once a transformation process is complete (e.g., all data from the old table has been written to the new table using a new schema format), the link between the logical and the existing table is changed. For example, the underlying reference to the physical table is altered to point to the new physical table instead of the existing database table. As one specific example, an Apache™ Phoenix table with a logical name that does not change will point to a new Apache Hbase™ table (with a new physical table name) with a different physical name than the old Apache Hbase™ table (with an existing physical table name).

The disclosed system performs two types of operations when implementing live schema changes: a mirroring operation and a transformation operation. The mirroring operation is performed until the transformation operation is complete and includes writing newly received data to both the existing physical table and a new physical table. The transformation operation includes writing data from the existing physical table to the new physical table using the new schema format (i.e., transforming the old data to the new table format).

The disclosed performance of schema changes while keeping database tables live does not require downtime, does not impact queries on the tables, does not require an end user to manually implement schema changes, allows for multiple different schema changes at the same time (improving the efficiency of the database), and ensures that CRUD (Create, Read, Update, and Delete) statements are either performed on the old table schema or the new table schema, but are never mixed (guarantees data consistency). For example, the disclosed techniques may advantageously ensure that an existing database object and a new database object are in a consistent state with one another during performance of a schema change operation. Such techniques may also advantageously lessen the burden on end users in that they will be able to implement schema changes within a single server system and do not have to search for external tools to assist in generating a new schema structure for various database objects. Further, the disclosed techniques advantageously allow multiple different schema changes (multiple of the same type or multiple different types) to be executed in parallel. For example, the disclosed techniques might allow a user to alter the storage format, column type, primary key, etc. of a schema of an existing database object all at once.

Example Server Computer System

Turning now to FIG. 1, a block diagram of a network 100 is shown. Network 100 includes a set of components that may be implemented via hardware or a combination of hardware and software routines. In various implementations, network 100 may be a wired or a wireless network. In the illustrated embodiment, network 100 includes client computing device 120, client computing devices 160, database 150 (having database objects 102A-102), and server computer system 110, which in turn includes transformation module 140. In some embodiments, transformation module 140 is a module executed by server computer system 110 to perform a schema change operation on an existing database object, such as object 102A.

Client computing device 120, in the illustrated embodiment, sends a request 122 for an existing database object 102A to server computer system 110. For example, request 122 specifies a logical table name that currently points to existing database object 102A. Request 122 specifies one or more data format changes for existing database object 102A. Database objects 102 may be indexes, tables, materialized views, etc. As one specific example, request 122 may specify one or more changes to be made to the schema of a table (one example of database object 102A) stored in database 150. In some embodiments, client computing device 120 receives a notification 112 indicating that the schema change(s) specified in request 122 have been executed within the database.

Server computer system 110, in the illustrated embodiment, includes transformation module 140 and mappings 130. For example, system 110 maintains information mapping logical object names to current physical names corresponding to existing database objects (such as objects 102A-102N) stored in database 150. For example, the logical names maintained by system 110 point to current physical names of objects stored in database 150. As one specific example, server computer system 110 may store a mapping that indicates a logical table name that points to a physical table name of an existing database table (one specific example of database object 102A) stored in database 150. System 110 may maintain mappings of logical objects names to physical names corresponding to each of database objects 102A-102N, for example. In various embodiments, client computing devices 160 are able to see the logical names pointing to database objects 102A-102N, but are not able to see the physical names corresponding to these database objects 102A-102N. As such, queries 124 from devices 160 specify logical names of objects 102 stored in database 150.

Server computer system 110, in the illustrated embodiment, performs a schema change operation for existing database object 102A based on request 122. For example, server computer system 110 operates transformation module 140 to perform the schema change operation for database objects 102A. Server computer system 110, in the illustrated embodiment, begins the schema change operation by placing a lock 116 on database object 102A. Lock 116 is a type of lock placed on an existing database object to prevent various systems other than system 110 from modifying the structure of the existing database object during the schema change operation. For example, other systems may read data from object 102A or write data to the object 102A, or both during the schema change operation, but these other systems are unable to alter the structure of the object while lock 116 is held by server computer system 110. Lock 116 may block, for example, data definition language (DDL) operation, but may allow data manipulation language (DML) operations to be performed on a database object. Lock 116, for example, is held on an existing database table by server computer system 110 such that only one schema change operation (which may include multiple changes to the schema of a database object) may be performed on the existing table at one time (while the lock is in place).

System 110 maintains a mapping indicating that a logical name for object 102A points to a current physical name for database object 102A In response to receiving request 122, server computer system 110 executes the schema change operation for database object 102A by creating a new database object 104A having a new physical name. Instead of updating the existing database object 102A, the disclosed techniques generate a new database object with a new physical name and cause the logical name to point to the new physical name of the new database object instead of the physical name of the existing database object after copying data from the existing object to the new object according to one or more requested schema changes. System 110 then copies existing data from database object 102A to new database object 104A having the new physical name while also transforming the copied data according to one or more data format changes specified in the schema change request 122 received from client computing device 120. Further as part of the schema change operations, system 110 mirrors newly received writes directed to the logical name of object 102A to both the existing object 102A and the new database object 104A. After copying all of the existing data from object 102A to object 104A, system 110 causes the logical name of object 102A to point to the new physical name of object 104A instead of the current physical name of object 102A. The schema change operation performed by server computer system 110 via transformation module 140 is discussed in further detail below with reference to FIGS. 2A and 2B.

In the illustrated embodiment, system 110 responds to queries 124 from client computing devices 160 requesting data stored in database object 102A. These queries specify the logical name of database object 102A. Before and during performance of the schema change operation, system 110 responds to queries 124 using data from object 102A. For example, in response to queries 124 received before and during the schema change operation, server computer system 110 performs database operations 118 on database object 102A. As one specific example, while performing the schema change operation, system 110 may read data from object 102 in response to a query from one of client computing devices 160 requesting information stored in object 102A. As another specific example, system 110 may write data to database object 102A in response to one of queries 124 specifying one or more DML operations. Server computer system 110 then transmits the retrieved data to appropriate ones of client computing devices 160. After completion of the schema change operation and based on the logical name of object 102A now pointing to the physical name corresponding to database object 104A, system 110 responds to queries 124 using data stored in database object 104A.

In some embodiments, two or more servers maintain data stored in database 150. As one specific example, a database region server (one example of server computing system 110) may host a database storing database objects 102A-102N, while a database metadata server may host a database storing metadata for database objects 102A-102N. In this specific example, the two different servers may be located in two different geographic regions and communicate via network 100 to service requests (such as request 122) from various client computing devices. In such implementations, network 100 may be wired between different geographic regions.

In some situations, queries using the old schema format of database object 102A after the schema change operation is complete will fail. For example, client computing devices 160 will be notified by system 110 to empty their schema caches storing the old schema format of object 102A and to instead store the new schema format of database object 104A for future querying. Upon query failure and notification from system 110, devices 160 request to open new connections to database 150 and through this process receive the new schema format data for database object 104A.

As used herein, the term "data format changes" refers to one or more alterations made to the structure of a database object. For example, data format changes are a subset of a set of changes that can be made to the schema of a database object. That is, a data change may refer to a change in the content of stored data, while a data format change refers to a change in the structure of stored data. As one specific example, a data format change specified in a schema change request may refer to a change in the column type or primary key, or both of a schema of an existing database object (e.g., a table). In various embodiments, alteration of the format in which data is stored may be referred to as a transformation of the data.

Figure 2A:
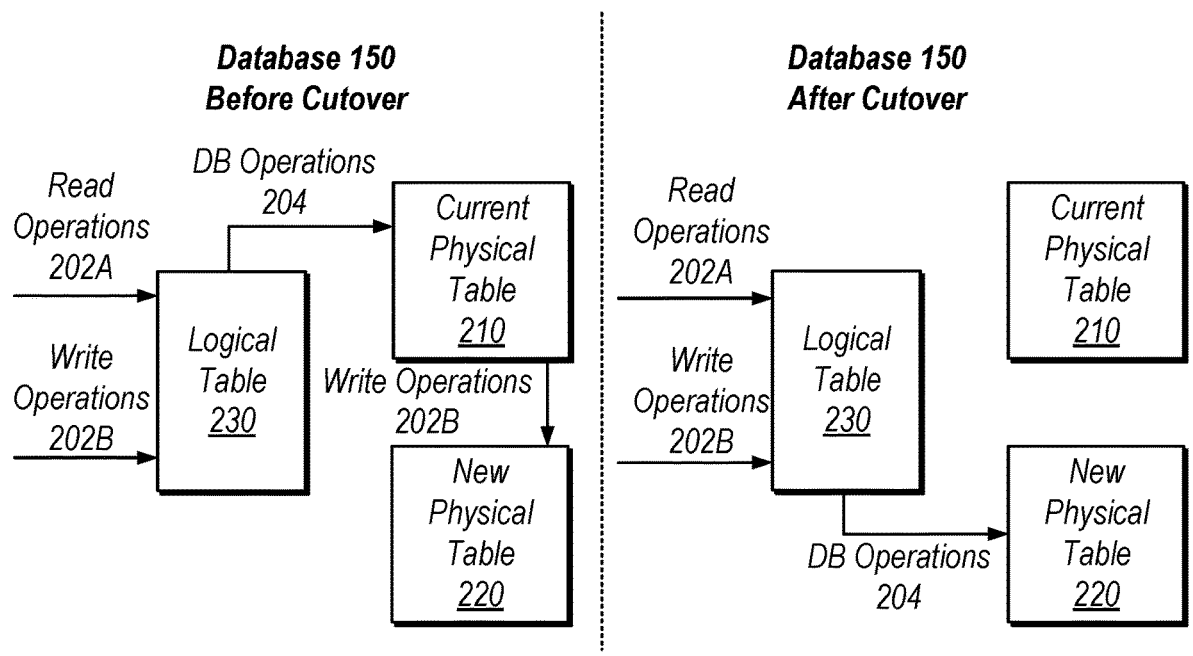
FIG. 2A is a block diagram illustrating example database operations performed on logical database tables before and after transformation, according to some embodiments.
Figure 2B:
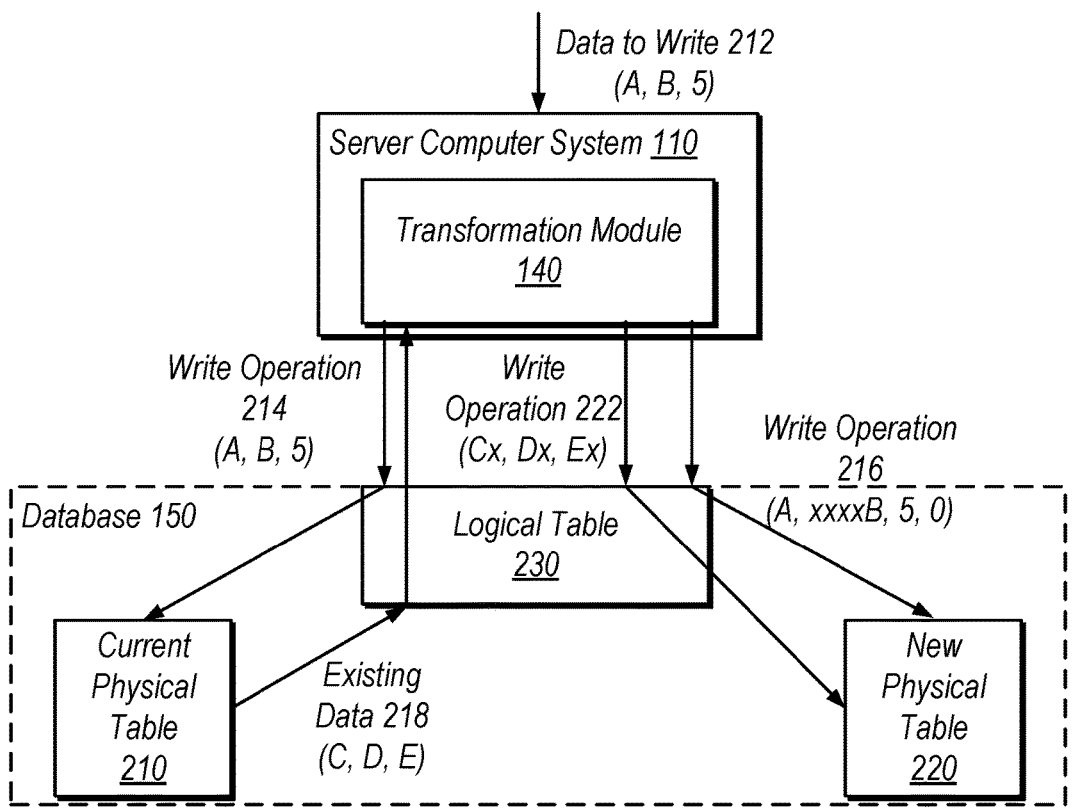
FIG. 2B is a block diagram illustrating example table population during transformation, according to some embodiments.

Turning now to FIGS. 2A and 2B, block diagrams illustrating example database operations performed before cutover (during performance of a schema change operation) and after cutover (after completion of the schema change operation) from a current database table to a new database table are shown. As used herein, the term "cutover" refers to an action performed when a schema change operation has been completed. For example, once a new database table has been generated and populated, according to one or more schema changes, with data from an existing database table, a server system will switch from using the existing database table for responding to queries for data to using the new database table for responding to queries. In FIG. 2A, database 150 is shown before and after cutover, while in FIG. 2B, example schema change operations performed by transformation module 140 are shown.

In FIG. 2A, before cutover to the new physical table 220, both read operations 202A and write operations 202B that are input to logical table 230 (e.g., requested by a client computing device via a query specifying the name of logical table 230) are performed on current physical table 210, while only write operations 202B are performed on new physical table 220. As shown in the illustrated embodiment, database (DB) operations 204 (including both read and write operations) are received by server computer system 110 in the form of a data manipulation (DML) operation. This DML operation specifies both the name of logical table 230 as well as one or more create, read, update, and delete (CRUD) operations to be executed on the logical table. System 110 performs the specified CRUD operations on the current physical table 210 based on the received database operations. For example, all CRUD operations are performed on the current physical table 210, while only a portion of the CRUD operations are performed on the new physical table 220 prior to cutover. In contrast, after cutover, both read operations 202A and write operations 202B (DB operations 204) are performed on new physical table 220 (and the current physical table 210 is no longer used for maintenance and storage of data) as shown in the right portion of FIG. 2A.

In FIG. 2B, operations performed by transformation module 140 before cutover (i.e., during performance of a schema change operation) to the new physical table 220 are shown. In the illustrated embodiment, server computer system 110 receives data 212 "A, B, 5" to be written to the database. For example, data 212 may be received from a client computing device 120 requesting to perform a database operation (write data to database 150). Transformation module 140 executes write operation 214 on current physical table 210 to write data 212 "A, B, 5" to current table 210 using the schema format in which the data 212 is received. Transformation module 140 transforms data 212 "A, B, 5" according to one or more format changes specified in a schema change request to generate data "A, xxxxB, 5, 0". Server computer system 110 then performs write operation 216 to write data "A, xxxxB, 5, 0" to new physical table 220.

In addition to performing transformations on newly received data 212 to be written to database 150, transformation module 140 transforms existing data 218. For example, server computer system 110 retrieves existing data 218 "C, D, E" from current physical table 210 and then executes transformation module 140 to transform the data to "Cx, Dx, Ex." Server computer system 110 then performs write operation 222 to write the transformed data "Cx, Dx, Ex" to new physical table 220. Server computer system 110 transforms all newly received data and all existing data during performance of the schema change operation for current physical table 210.

In some embodiments, server computer system 110 performs the schema change operation by generating, prior to copying existing data 218 from current physical table 210 to new physical table 220, a snapshot of the current physical table 210. For example, system 110 captures a snapshot of data stored in current physical table 210 at the moment a schema change operation is initiated. Server computer system 110 then copies existing data 218 based on the data that is included in the snapshot of the existing database object. In this way, server computer system 110 is able to keep track of which data is actually previously existing data and which data has been newly added to current physical table 210 (e.g., which data has been stored in current physical table 210 since the schema change operation was initiated). Any data written to current physical table 210 after the snapshot was captured is considered new data and will be handled during the mirroring performed by server computer system 110 as part of the schema change operation.

Figure 3:
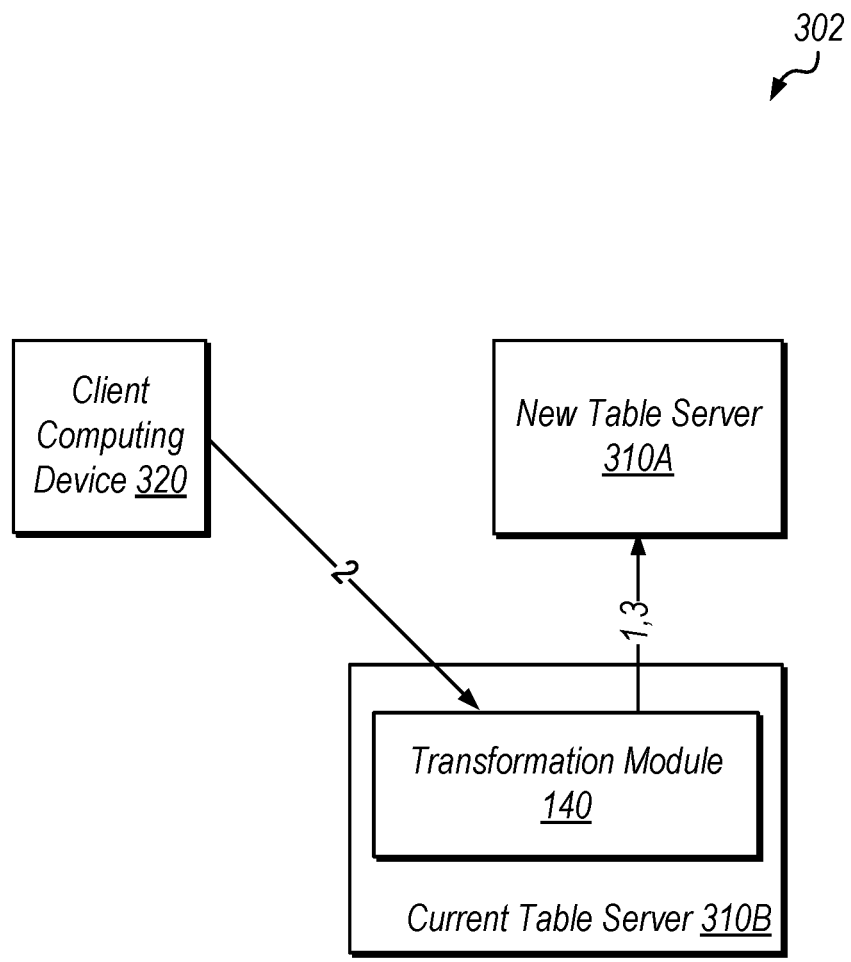
FIG. 3 is a block diagram illustrating example error handling during table transformation, according to some embodiments.

In some embodiments, while copying and transforming data from current physical table 210 to new physical table 220, server computer system 110 records results of the transformation according to one or more data format changes. For example, server computer system 110 may record whether a portion of transformed and copied data is successful and committed or whether the transformation failed. In some embodiments, server computer system 110 performs a repair process based on the recorded results of the transformation process. For example, any failed or uncommitted writes to new physical table 220 may be repaired (retried) by system 110. This commit process may be referred to as a two-phase commit. FIG. 3 below illustrated the two-phase commit process performed by server computer system 110 as part of a schema change operation.

Turning now to FIG. 3, a block diagram is shown illustrating example error handling during performance of a schema change operation. In example 302, in the illustrated embodiment, client computing device 320 communicates with two servers 310A and 310B. These two servers may operate in different geographic regions during performance of a schema change operation requested by client computing device 320. Current table server 310B is one example of server computer system 110.

The operations discussed with reference to FIG. 3 are performed as part of a two-phase commit process during a schema change operation to ensure consistency between an existing physical database table and a new physical database table. As discussed in further detail below, during a first phase of the two-phase commit process, a database server sets status identifiers of various rows within a new physical database to "unverified." Then, the database server writes data from the existing table to the new table. During a second phase of the two-phase commit process, the status identifiers for rows in the new physical table are updated according to the data that was written to the new table. Based on the status of the rows of the new physical table, the database server performs a repair process on the new physical database table. Such processes may advantageously be performed to handle errors during a schema change operation e.g., resulting from massive amounts of data requiring transformation according to one or more data format changes specified in the schema change operation.

At element 1, in FIG. 3, transformation module 140 of current table server 310B writes newly received data to the new physical table maintained by new table server 310A and stores an "unverified" Boolean status indicator for this write operation in the new physical table. For example, current table server 310B creates a new row within the new physical table and writes data from an existing physical table to this new row. If the write fails, transformation module 140 returns an indication of the failure to the client computing device 160. Further, if the write fails, current table server 310B stores an "unverified" status identifier in the rows of the new physical table indicated in the write operation (these rows are left unverified and will be repaired at a later time). For example, a column of the new physical table is dedicated to storing a Boolean field (e.g., true or false) indicating whether a write to a corresponding row in the new physical table is "unverified" (false) or "verified" (true). If, however, the write operation is successful, new table server 310B stores a "verified" Boolean status indicator in the row of the new physical table being written to. When a repair process is performed on the new physical table, this row will not require repairs according to the "verified" status indicator (the write was successful and thus does not need to be retried).

At element 2, client computing device 320 writes newly received data to the current database table (maintained by the current table server 310B); however, transformation module 140 intercepts this write operation and proceeds to write the newly received data to the new table (maintained by new table server 310A) with an unverified status. Also at element 2, transformation module 140 writes the newly received data to the current table maintained by current table server 310B. If the write to the current table fails, then the row written to the new physical table is left unverified.

At element 3, if the write operations performed at element 2 are successful, transformation module 140 updates the status identifiers of the rows of the new physical table corresponding to the write operations by setting the identifiers stored within these rows to "verified" (true) indicating that the newly received data written to both the current and new physical tables was successful. Note that once the two-phase commit process performed in FIG. 3 is complete, current table server 310B may initiate a repair process. This repair process includes observing rows within the new physical table marked with the "unverified" status identifier and either rebuilding the unverified row (e.g., attempt to write the data from the current physical table to the new physical table again) or if no such row exists in the current physical table, the current table server 310B performs the repair process by deleting the unverified row from the new physical table.

Figure 4:
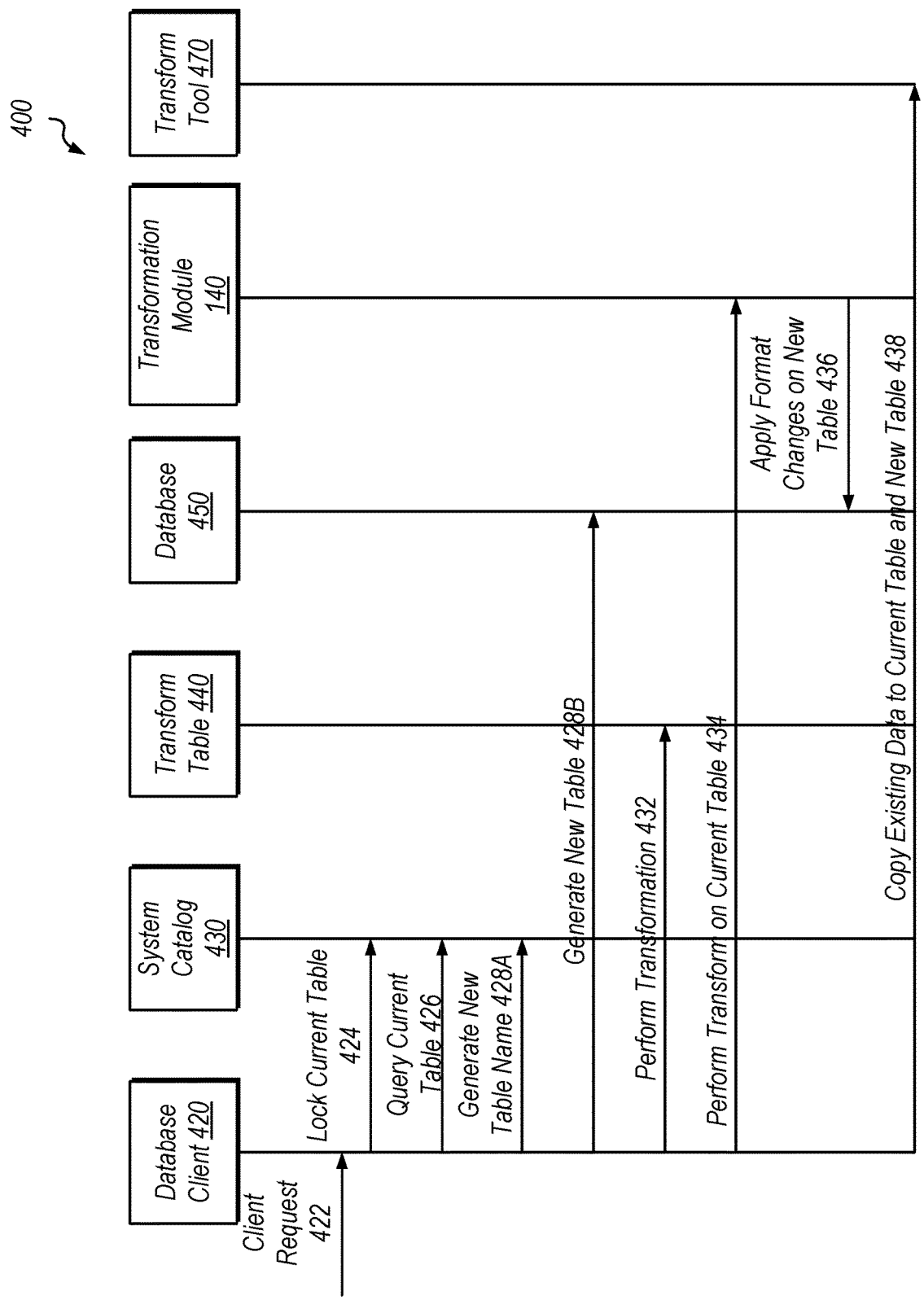
FIG. 4 is a flow diagram illustrating example method for initiating a schema change operation for a database table, according to some embodiments.

FIG. 4 is a flow diagram illustrating example method 400 for initiating a schema change operation for a database table. In the illustrated embodiment, an example method 400 involving database client 420, system catalog 430, transform table 440, database 450, transformation module 140, and transform tool 470 is performed to implement a schema change operation for an existing database object. The schema change operation is performed based on a request 422 from a client computing device to perform one or more data format changes on the existing database object. In some embodiments, system catalog 430, transform table 440, and database 450 all share the same storage repository. In other embodiments, system catalog 430, transform table 440, and database 450 are stored in separate storage repositories.

Database client 420, in the illustrated embodiment, receives client request 422 from a client computing device (e.g., client computing device 120 shown in FIG. 1) requesting to perform one or more data format changes on a current table. For example, a user may send an ALTER TABLE request specifying the logical table name of an existing database table stored in database 450 as well as one or more changes the user would like to make to the schema format of the current table. As one specific example, database client 420 may be a client portion of Apache Phoenix™ that takes SQL queries (one example of client request 422) and translates these queries to Apache Hbase™ operations before sending these operations to the database (e.g., Apache Hbase™). For example, database client 420 operates at a logical table level, while transformation module 140 operates at a physical table level. Database client 420, at element 424, sends a command to system catalog 430 to place a lock on the current table. This lock causes other ALTER TABLE commands, received from the same client device or different client devices, specifying the current table to fail. Database client 420 may place this lock by adding a new column to the system catalog 430 table that specifies "IS_MODIFIABLE." In other situations, client 420 places a mutex lock on the current table itself within the database 450. In such situations, the mutex table lock includes a time to live (TTL) value.

System catalog 430 is a table storing metadata in tables and views describing various objects stored in database 450. As one specific example, the system catalog table may be created by a Phoenix server to track metadata for all tables stored in database 450, such as the number of columns, types of data, mappings between logical table names and physical table names for existing database tables, etc. This information may be used to determine which database object a given client query is directed to (e.g., which physical table does this logical table name referenced in a client query point to?).

After placing a lock on the current table, database client 420 performs a query 426 to retrieve metadata for the current table stored in the system catalog 430. For example, database client 420 may query the system catalog using the logical table name of the current table to obtain metadata specify the current structure (schema) of the current table. At element 428A, database client 420 generates a new physical name for a new table and stores this new physical name in system catalog 430 in associated with a new table to be stored in database 450. After obtaining the structural information about the current table, database client 420 generates a new table at element 428B corresponding to the new physical name and stores this table in database 450. The new table is generated by combining the existing structural information with structure parameters specified in the client request 422 (e.g., maintain the same number of columns and column types, but alter the storage format of specified in the structural information).

At element 432 database client 420 stores schema change records including information associated with a current schema change operation in a transform table 440. For example, the schema change records may include information specifying details for the new database table, the current database table, metadata for the current database table, an identifier for the current schema change operation being performed, whether the schema change was successful, a number of times schema change processes have failed, what type of schema change is being performed, a timestamp for initiation of the schema change, etc. At element 434, sends a request to transformation module 140 to perform a transform on the current table. For example, transformation module 140 may be executed by server computer system 110 (shown in FIG. 1) to perform a mirroring operation (e.g., get live CRUD operations from a client device and converts newly received data from the old schema format of the current table to the new format of the new table). Transformation module 140 operates at the physical table level, for example.

At element 436, in response to the request at element 434, transformation module 140 applies one or more format changes to newly received data to be stored in the current table and stores the altered data in the new table within database 450. Transformation module 140 identifies where to store the transformed data within database 450 (e.g., which table) based on the metadata stored in the system transform table 440 (e.g., based on the new physical name for the new table being associated with the current schema change identifier).

At element 438, database client 420 sends a request to transform tool 470 to copy existing data from current table to the new table stored in database 450. As part of the copying process, transform tool 470 transforms the existing data according to the one or more schema format changes specified in the schema change request 422 received from a client computing device. As one specific example, transform tool 470 may be a module that implements the copying portion of a schema change operation using the MapReduce™ data processing paradigm. In some situations, transform tool 470 verifies and records mismatches between the data in the current database table and data in the new database table. Transform tool 470 also copies local indexes and view data associated with the current database table in association with the new database table. Once it is finished copying all of the existing data in the current table, transform tool 470 updates a status indicator in transform table 440 indicating that the new table is ready to be used (or that the copying process failed). Based on this information being stored in transform table 440, database client 420 can decide whether to reinitiate the schema change operation or whether the operation is successful and to end the schema change process being performed on newly received data that is being stored in the new database table by transformation module 140.

Figure 5:
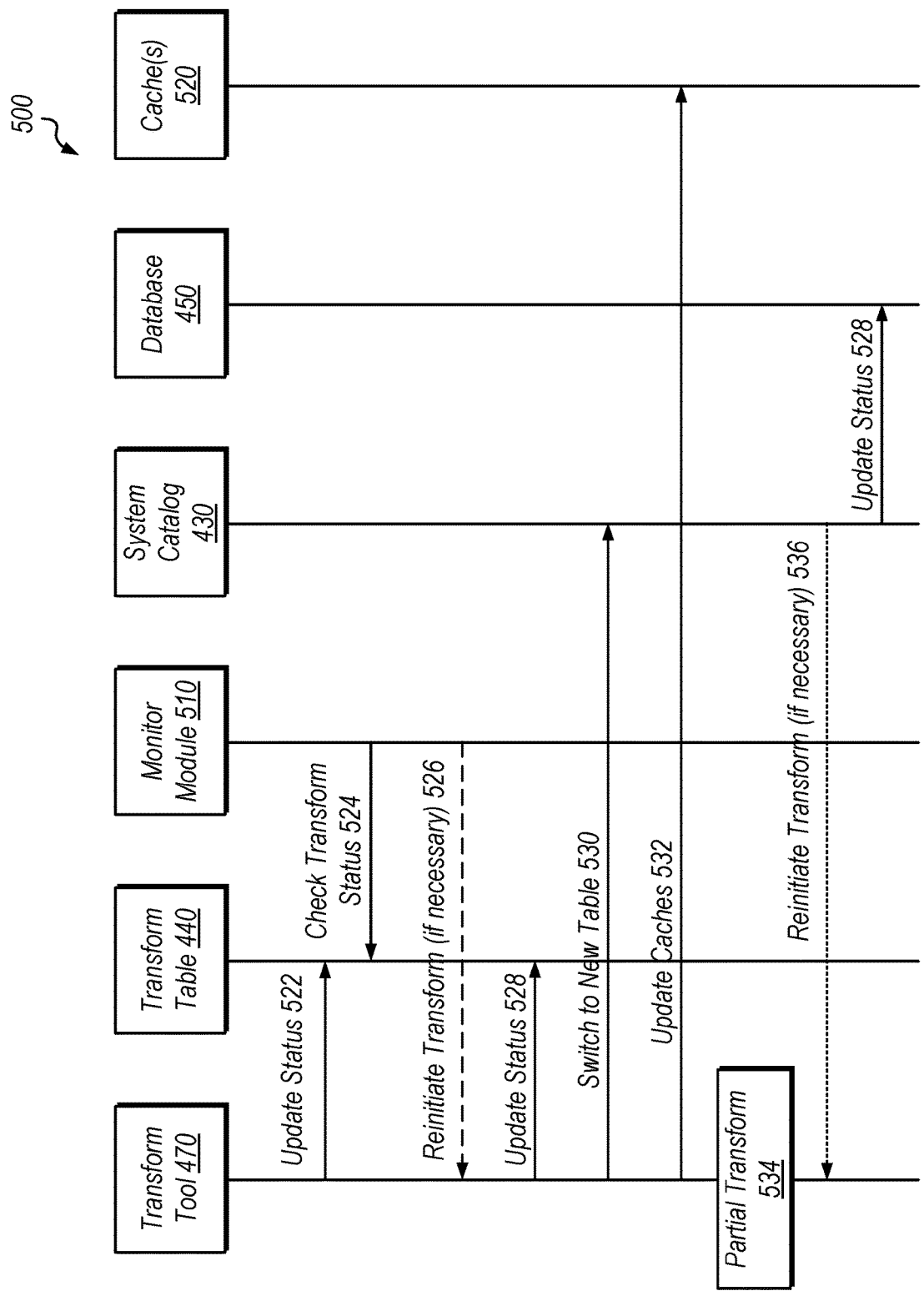
FIG. 5 is a flow diagram illustrating an example method for completing a schema change operation for a database table, according to some embodiments.

Turning now to FIG. 5, a flow diagram is shown illustrating an example method 500 for completing a schema change operation for a database table (e.g., elements included in method 500 are performed at the end of a schema change process). In the illustrated embodiment, transform tool 470, transform table 440, monitor module 510, system catalog 430, database 450 and cache(s) 520 are utilized within a network (e.g., network 100) to perform example method 500. Monitor module 510 is an error handling module that monitors results of actions executed by transform tool 470.

At element 522, transform tool 470 sends a command to transform table 440 to update the status of a current schema change process (e.g., a current schema change process is halfway finished, the schema change process has just initiated, the schema change process has failed, etc.). At element 524, monitor module 510 queries the transform table 440 to determine the current status of the schema change process. Based on the statues information, monitor module 510 queries from transform table 440, module 510 determines whether (and how many times) to retry the schema change process. For example, if the status of the transform retrieved from table 440 indicates a failure, monitor module 510 may reinitiate, at element 526, the schema change process. As another example, if the status of the schema change retrieved from table 440 indicates that the transform is complete, monitor module 510 may instruct server computer system 110 (discussed with reference to FIG. 1) to cutover from the current table to the new table. At element 528, transform tool 470 updates the status of the schema change process (e.g., based on the reiteration at 526, based on the schema change progress, etc.).

At element 530, transform tool 470 sends a command to system catalog 430 to switch over from using the current table to using the new table. This command is sent based on the transform table 440 indicating that the schema change process is complete and successful (e.g., that all the data between the current table and the new table are in sync). As part of switching over to the new table, transform tool 470 write the new physical table name to the physical table name column of the system catalog 430 table corresponding to the new database table and alters the metadata values included in this system catalog table. After this point, reads and writes specifying the logical table name corresponding to the current database table will be server from the new database table instead.

At element 532, the transform tool 470 expires data stored in caches in the database (e.g., because these caches may store data from the current table prior to the schema changes being performed). At element 532, transform tool 470 begins one or more partial schema changes (e.g., to fix failed online schema changes that occurred during the original schema change process that were missed by the transform tool 470). Monitor module 510 monitors the status of the partial schema changes and retries, at element 536, these partial schema changes if necessary. Transform tool 470 performs these partial schema changes based on retrieving metadata for the current table from the transform table 440 in order to parse and transform data stored in the current database table. For example, based on a column in the system transform table 440 for the current database table specifying the type of schema change, transform tool 470 will identify what values to use when implementing changes to the schema of the current database table.

At 528, system catalog 430 clears out entries for the new database table and sets the status of an "is_modifiable" column to true (i.e., the schema new database table is allowed to be altered again once a current set of schema changes requested by a given client device is complete). Further, the schema change record stored in transform table 440 for the current database table is marked as complete. In some embodiments, the transform tool 470 executes an index rebuild for all the indexes of the current database table as well as the views of the current database table. For example, if a client computing device requests to alter the primary key structure of the current database table, the indexes of the current database table may in turn need to be updated to remain consistent with the current database table.

Figure 6:
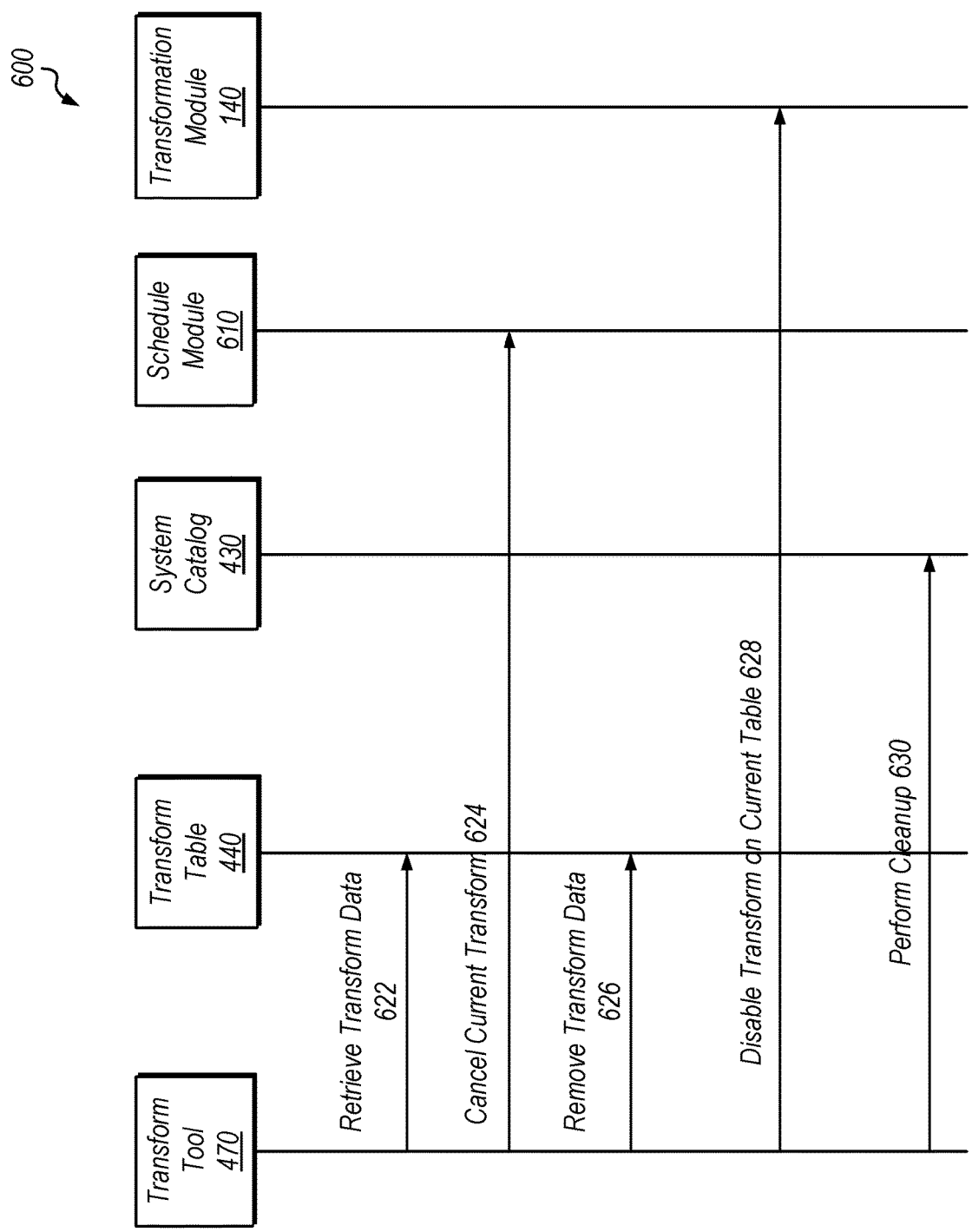
FIG. 6 is a flow diagram illustrating example method for canceling transformation of a database table, according to some embodiments.

FIG. 6 is a flow diagram illustrating example method 600 for canceling transformation of a database table. In the illustrated embodiment, transform tool 470, transform table 440, system catalog 430, schedule module 610, and transformation module 140 communicate to perform method 600. Schedule module 610 is distributed operating system that is, in some situations, utilized for applications involving large amounts of data. For example, schedule module 610 may manage computing resources and perform various job scheduling in disclosed embodiments. YARN MapReduce is one specific example of a schedule module 610. As one specific example, schedule module may schedule multiple jobs to be run as part of a schema change operation (e.g., read a portion of an existing database table and alter the format before storing the data included in this portion within a new database table). As discussed below with reference to element 634, schedule module may cancel multiple schedule jobs to end a schema change operation currently being performed on an existing database object. In various embodiments, schedule module is technology designed for cluster database management and may be implemented in combination with Apache Hadoop™.

For availability reasons (of computing resources), the server computer system 110 might need to pause a schema change operation for a current database table during execution. In order to achieve this, the system 110 can set the schema change status field included in the transform table 440 for the current database table to "pause," such that transform tool 470 will not be instructed to retry a schema change process (e.g., by monitor module 510). The status field may be set to "resume" causing the transform tool 470 to proceed with execution of the schema change operation.

In contrast, in some situations, the server computer system 110 may cancel a schema change operation during execution. In the illustrated embodiment, at element 622, transform tool retrieves a current status of a schema change operation performed on a current database table from transform table 440. If there is not record in transform table 440 for a schema change operation, then transform tool 470 does nothing. If, however, there is a schema change operation being performed as indicated by the transform data in table 440, transform tool 470 retrieves a job identifier associated with this operation and removes the record from the system transform table 440 for this operation. Further, at element 624, transform tool 470 cancels the current schema change operation by sending a command to schedule module 610.

At element 628, transform tool 470 instructs transformation module 140 to disable the schema change operation currently being performed on the current database table (e.g., stored in database 450). At element 630, transform tool 470 performs a cleanup of system catalog 430. For example, transform tool 470 deletes entries stored in system catalog 430 for the new database table. In addition, transform tool 470 remove a lock currently held on the current database table (such that new schema change requests may be accepted and implemented for the current table).

Example Method

Figure 7:
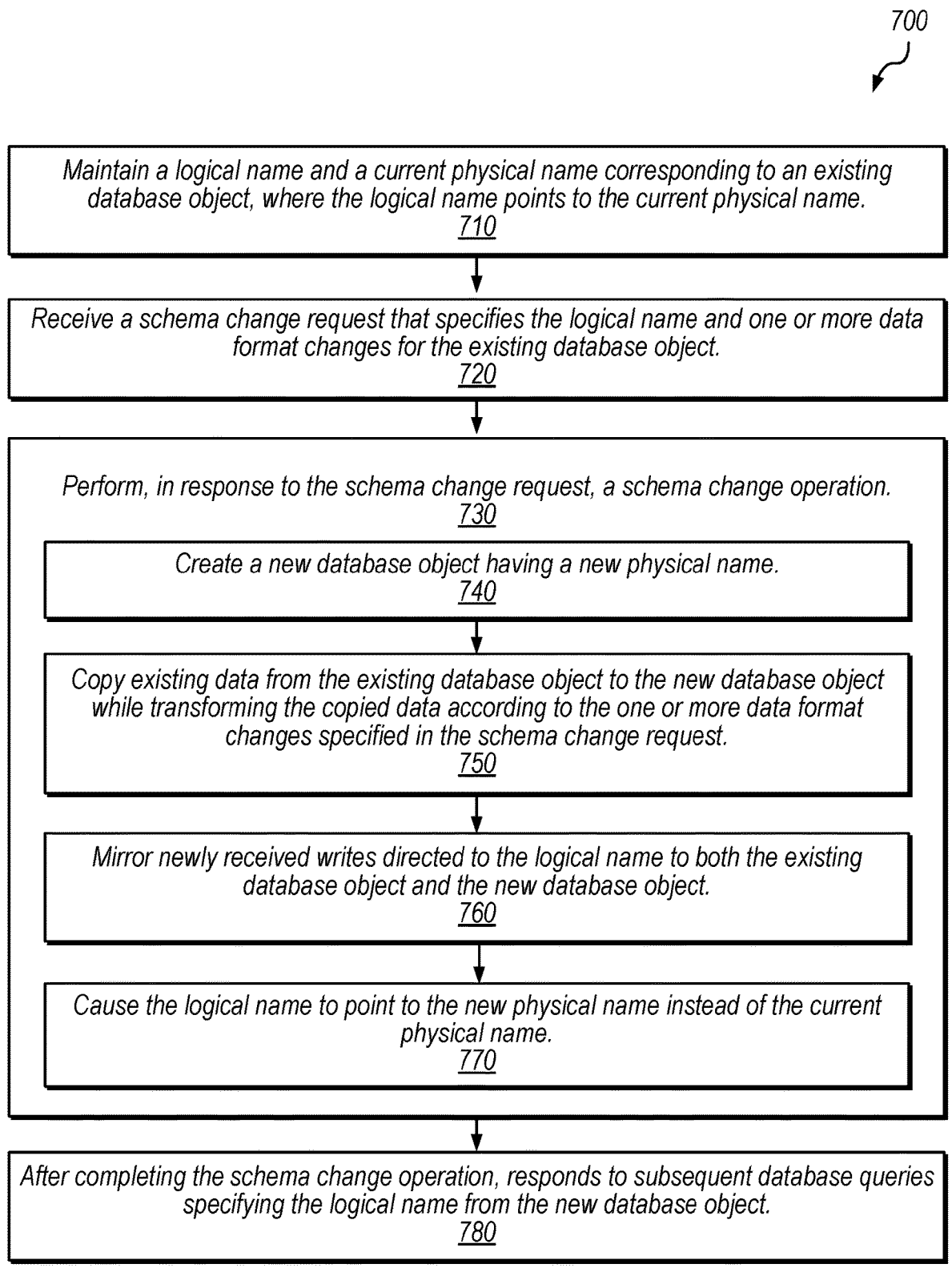
FIG. 7 is a flow diagram illustrating an example method for performing a schema change operation for an existing database object, according to some embodiments.

FIG. 7 is a block diagram illustrating an example method for performing a schema change operation for an existing database object, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, method 700 is formed by server computing system 110.

At element 710, a server computer system maintains a logical name and a current physical name corresponding to an existing database object, where the logical name points to the current physical name. As one specific example, a logical table name that points to an old database table might be "TBL1," while an old physical name corresponding to the old database table might also be "TBL1." Further in this specific example, due to performance of a schema change operation, a new physical table name corresponding to a new database table might be "TBL1_1," while the logical table name "TBL1" remains the same but now points to the new physical table name "TBL1_1" instead of the old physical table name "TBL1."

At 720, the server computer system receives a schema change request that specifies the logical name and one or more data format changes for the existing database object. In some embodiments, the one or more data format changes include at least a primary key attribute change.

At 730, the server computer system performs, in response to the schema change request, a schema change operation. In some embodiments, performing the schema change operation includes placing a lock on the existing database object, where the lock prevents additional schema change requests from altering a schema of the existing database object during the schema change operation. At 740, the server computer system creates a new database object having a new physical name.

At 750, the server computer system copies existing data from the existing database object to the new database object while transforming the copied data according to the one or more data format changes specified in the schema change request. In some embodiments, the copying includes recording, based on results of transforming the copied data according to the one or more data format changes, whether the transformation is committed. In some embodiments, the copying includes performing, after completing the copying based on the recording, a repair process, wherein the repair process transforms copied data associated with recorded, uncommitted changes according to the one or more data format changes specified in the schema change request. For example, the copying may include performing a two-phase commit procedure that catches errored writes made during transformation of existing data retrieved from a current database table and placed in a new database table.

At 760, the server computer system mirrors newly received writes directed to the logical name to both the existing database object and the new database object. In some embodiments, performing the schema change operation includes retrieving, from a catalog object stored in a database utilized by the server computer system to store the existing database object and the new database object, metadata for the existing database object, where the metadata specifies a physical name corresponding to a database object to which the logical name is currently pointing. For example, the catalog object may be stored in a system catalog maintained by the server computer system 110 for database 150. In some embodiments, performing the schema change operation includes, in response to detecting that at least one of the copying and the mirroring have failed during performance of the schema change operation, relaunching the schema change operation, where relaunching includes restarting the schema change operation for the existing database object.

At 770, after completing the copying, the server computer system causes the logical name to point to the new physical name instead of the current physical name. In some embodiments, performing the schema change operation further includes generating, prior to the copying, a snapshot of the existing database object, where the copying existing data from the existing database object to the new database object is performed based on the data included in the snapshot of the existing database object. In some embodiments, the server computer system stores, in a database object, metadata for a plurality of schema change operations performed on one or more existing database objects. For example, the server may store data for various schema change operations in a system transform table included in a system catalog indicating the status of such operations.

At 780, after completing the schema change operation, the server computer system responds to subsequent database queries specifying the logical name from the new database object. In some embodiments, performing the schema change operation further includes, in response to completing the schema change operation, removing the lock from the existing database object.

In some embodiments, the server computer system responds, prior to completing the schema change operation, to database queries specifying the logical name from the existing database object. For example, the disclosed techniques may advantageously provide data consistency between the current database object and the new database object such that queries received during performance of the schema change operation are guaranteed to be handled using a most recent version of data stored in the database object (e.g., insert, delete, update, etc. statements will act consistently even if they are made during performance of a schema change operation). In some embodiments, database queries received during performance of the schema change operation and specifying the logical name are consistent with writes received during performance of the schema change operation.

Exemplary Multi-Tenant Database System

Figure 8:
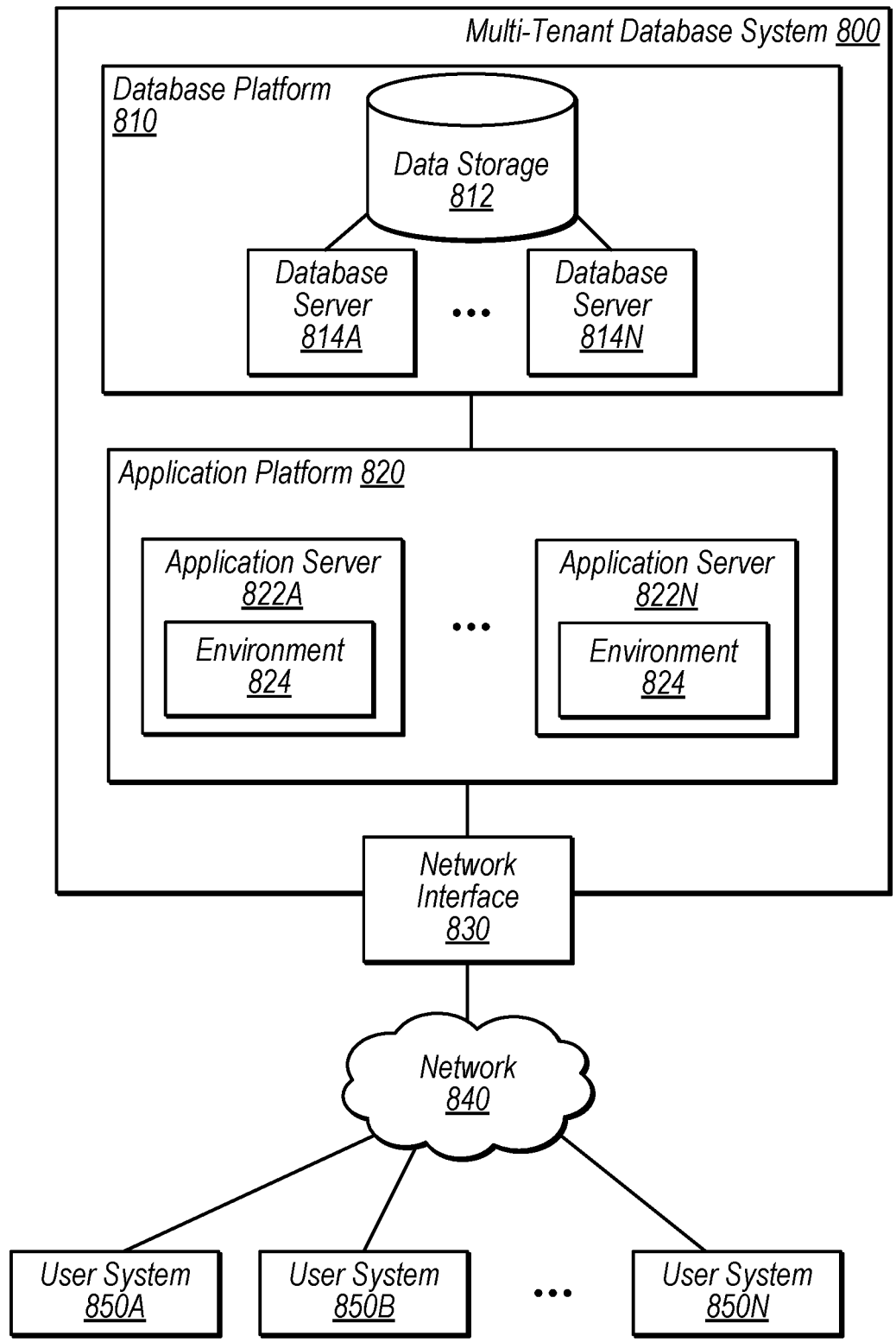
FIG. 8 is a block diagram illustrating elements of a multi-tenant system corresponding to the system described in the present disclosure, according to some embodiments.

Turning now to FIG. 8, an exemplary multi-tenant database system (MTS) 800 in which various techniques of the present disclosure can be implemented is shown—e.g., server computer system 110 may be MTS 800. In FIG. 8, MTS 800 includes a database platform 810, an application platform 820, and a network interface 830 connected to a network 840. Also as shown, database platform 810 includes a data storage 812 and a set of database servers 814A-N that interact with data storage 812, and application platform 820 includes a set of application servers 822A-N having respective environments 824. In the illustrated embodiment, MTS 800 is connected to various user systems 850A-N through network 840. The disclosed multi-tenant system is included for illustrative purposes and is not intended to limit the scope of the present disclosure. In other embodiments, techniques of this disclosure are implemented in non-multi-tenant environments such as client/server environments, cloud computing environments, clustered computers, etc.

MTS 800, in various embodiments, is a set of computer systems that together provide various services to users (alternatively referred to as "tenants") that interact with MTS 800. In some embodiments, MTS 800 implements a customer relationship management (CRM) system that provides mechanism for tenants (e.g., companies, government bodies, etc.) to manage their relationships and interactions with customers and potential customers. For example, MTS 800 might enable tenants to store customer contact information (e.g., a customer's website, email address, telephone number, and social media data), identify sales opportunities, record service issues, and manage marketing campaigns. Furthermore, MTS 800 may enable those tenants to identify how customers have been communicated with, what the customers have bought, when the customers last purchased items, and what the customers paid. To provide the services of a CRM system and/or other services, as shown, MTS 800 includes a database platform 810 and an application platform 820.

Database platform 810, in various embodiments, is a combination of hardware elements and software routines that implement database services for storing and managing data of MTS 800, including tenant data. As shown, database platform 810 includes data storage 812. Data storage 812, in various embodiments, includes a set of storage devices (e.g., solid state drives, hard disk drives, etc.) that are connected together on a network (e.g., a storage attached network (SAN)) and configured to redundantly store data to prevent data loss. In various embodiments, data storage 812 is used to implement a database (e.g., database 150) comprising a collection of information that is organized in a way that allows for access, storage, and manipulation of the information. Data storage 812 may implement a single database, a distributed database, a collection of distributed databases, a database with redundant online or offline backups or other redundancies, etc. As part of implementing the database, data storage 812 may store files that include one or more database records having respective data payloads (e.g., values for fields of a database table) and metadata (e.g., a key value, timestamp, table identifier of the table associated with the record, tenant identifier of the tenant associated with the record, etc.).

In various embodiments, a database record may correspond to a row of a table. A table generally contains one or more data categories that are logically arranged as columns or fields in a viewable schema. Accordingly, each record of a table may contain an instance of data for each category defined by the fields. For example, a database may include a table that describes a customer with fields for basic contact information such as name, address, phone number, fax number, etc. A record therefore for that table may include a value for each of the fields (e.g., a name for the name field) in the table. Another table might describe a purchase order, including fields for information such as customer, product, sale price, date, etc. In various embodiments, standard entity tables are provided for use by all tenants, such as tables for account, contact, lead and opportunity data, each containing pre-defined fields. MTS 800 may store, in the same table, database records for one or more tenants—that is, tenants may share a table. Accordingly, database records, in various embodiments, include a tenant identifier that indicates the owner of a database record. As a result, the data of one tenant is kept secure and separate from that of other tenants so that that one tenant does not have access to another tenant's data, unless such data is expressly shared.

In some embodiments, the data stored at data storage 812 is organized as part of a log-structured merge-tree (LSM tree). An LSM tree normally includes two high-level components: an in-memory buffer and a persistent storage. In operation, a database server 814 may initially write database records into a local in-memory buffer before later flushing those records to the persistent storage (e.g., data storage 812). As part of flushing database records, the database server 814 may write the database records into new files that are included in a "top" level of the LSM tree. Over time, the database records may be rewritten by database servers 814 into new files included in lower levels as the database records are moved down the levels of the LSM tree. In various implementations, as database records age and are moved down the LSM tree, they are moved to slower and slower storage devices (e.g., from a solid-state drive to a hard disk drive) of data storage 812.

When a database server 814 wishes to access a database record for a particular key, the database server 814 may traverse the different levels of the LSM tree for files that potentially include a database record for that particular key. If the database server 814 determines that a file may include a relevant database record, the database server 814 may fetch the file from data storage 812 into a memory of the database server 814. The database server 814 may then check the fetched file for a database record having the particular key. In various embodiments, database records are immutable once written to data storage 812. Accordingly, if the database server 814 wishes to modify the value of a row of a table (which may be identified from the accessed database record), the database server 814 writes out a new database record to the top level of the LSM tree. Over time, that database record is merged down the levels of the LSM tree. Accordingly, the LSM tree may store various database records for a database key where the older database records for that key are located in lower levels of the LSM tree then newer database records.

Database servers 814, in various embodiments, are hardware elements, software routines, or a combination thereof capable of providing database services, such as data storage, data retrieval, and/or data manipulation. A database server 814 may correspond to server computer system 110. Such database services may be provided by database servers 814 to components (e.g., application servers 822) within MTS 800 and to components external to MTS 800. As an example, a database server 814 may receive a database transaction request from an application server 822 that is requesting data to be written to or read from data storage 812. The database transaction request may specify an SQL SELECT command to select one or more rows from one or more database tables. The contents of a row may be defined in a database record and thus database server 814 may locate and return one or more database records that correspond to the selected one or more table rows. In various cases, the database transaction request may instruct database server 814 to write one or more database records for the LSM tree—database servers 814 maintain the LSM tree implemented on database platform 810. In some embodiments, database servers 814 implement a relational database management system (RDMS) or object-oriented database management system (OODBMS) that facilitates storage and retrieval of information against data storage 812. In various cases, database servers 814 may communicate with each other to facilitate the processing of transactions. For example, database server 814A may communicate with database server 814N to determine if database server 814N has written a database record into its in-memory buffer for a particular key.

Application platform 820, in various embodiments, is a combination of hardware elements and software routines that implement and execute CRM software applications as well as provide related data, code, forms, web pages and other information to and from user systems 850 and store related data, objects, web page content, and other tenant information via database platform 810. In order to facilitate these services, in various embodiments, application platform 820 communicates with database platform 810 to store, access, and manipulate data. In some instances, application platform 820 may communicate with database platform 810 via different network connections. For example, one application server 822 may be coupled via a local area network and another application server 822 may be coupled via a direct network link. Transfer Control Protocol and Internet Protocol (TCP/IP) are exemplary protocols for communicating between application platform 820 and database platform 810, however, it will be apparent to those skilled in the art that other transport protocols may be used depending on the network interconnect used.

Application servers 822, in various embodiments, are hardware elements, software routines, or a combination thereof capable of providing services of application platform 820, including processing requests received from tenants of MTS 800. Application servers 822, in various embodiments, can spawn environments 824 that are usable for various purposes, such as providing functionality for developers to develop, execute, and manage applications (e.g., business logic). Data may be transferred into an environment 824 from another environment 824 and/or from database platform 810. In some cases, environments 824 cannot access data from other environments 824 unless such data is expressly shared. In some embodiments, multiple environments 824 can be associated with a single tenant.

Application platform 820 may provide user systems 850 access to multiple, different hosted (standard and/or custom) applications, including a CRM application and/or applications developed by tenants. In various embodiments, application platform 820 may manage creation of the applications, testing of the applications, storage of the applications into database objects at data storage 812, execution of the applications in an environment 824 (e.g., a virtual machine of a process space), or any combination thereof. In some embodiments, application platform 820 may add and remove application servers 822 from a server pool at any time for any reason, there may be no server affinity for a user and/or organization to a specific application server 822. In some embodiments, an interface system (not shown) implementing a load balancing function (e.g., an F5 Big-IP load balancer) is located between the application servers 822 and the user systems 850 and is configured to distribute requests to the application servers 822. In some embodiments, the load balancer uses a least connections algorithm to route user requests to the application servers 822. Other examples of load balancing algorithms, such as are round robin and observed response time, also can be used. For example, in certain embodiments, three consecutive requests from the same user could hit three different servers 822, and three requests from different users could hit the same server 822.

In some embodiments, MTS 800 provides security mechanisms, such as encryption, to keep each tenant's data separate unless the data is shared. If more than one server 814 or 822 is used, they may be located in close proximity to one another (e.g., in a server farm located in a single building or campus), or they may be distributed at locations remote from one another (e.g., one or more servers 814 located in city A and one or more servers 822 located in city B). Accordingly, MTS 800 may include one or more logically and/or physically connected servers distributed locally or across one or more geographic locations.

One or more users (e.g., via user systems 850) may interact with MTS 800 via network 840. User system 850 may correspond to, for example, a tenant of MTS 800, a provider (e.g., an administrator) of MTS 800, or a third party. Each user system 850 may be a desktop personal computer, workstation, laptop, PDA, cell phone, or any Wireless Access Protocol (WAP) enabled device or any other computing device capable of interfacing directly or indirectly to the Internet or other network connection. User system 850 may include dedicated hardware configured to interface with MTS 800 over network 840. User system 850 may execute a graphical user interface (GUI) corresponding to MTS 800, an HTTP client (e.g., a browsing program, such as Microsoft's Internet Explorer™ browser, Netscape's Navigator™ browser, Opera's browser, or a WAP-enabled browser in the case of a cell phone, PDA or other wireless device, or the like), or both, allowing a user (e.g., subscriber of a CRM system) of user system 850 to access, process, and view information and pages available to it from MTS 800 over network 840. Each user system 850 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 800 or other systems or servers. As discussed above, disclosed embodiments are suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

Because the users of user systems 850 may be users in differing capacities, the capacity of a particular user system 850 might be determined one or more permission levels associated with the current user. For example, when a salesperson is using a particular user system 850 to interact with MTS 800, that user system 850 may have capacities (e.g., user privileges) allotted to that salesperson. But when an administrator is using the same user system 850 to interact with MTS 800, the user system 850 may have capacities (e.g., administrative privileges) allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level. There may also be some data structures managed by MTS 800 that are allocated at the tenant level while other data structures are managed at the user level.

In some embodiments, a user system 850 and its components are configurable using applications, such as a browser, that include computer code executable on one or more processing elements. Similarly, in some embodiments, MTS 800 (and additional instances of MTSs, where more than one is present) and their components are operator configurable using application(s) that include computer code executable on processing elements. Thus, various operations described herein may be performed by executing program instructions stored on a non-transitory computer-readable medium and executed by processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the disclosed embodiments can be implemented in any programming language that can be executed on a server or server system such as, for example, in C, C+, HTML, Java, JavaScript, or any other scripting language, such as VBScript.

Network 840 may be a LAN (local area network), WAN (wide area network), wireless network, point-to-point network, star network, token ring network, hub network, or any other appropriate configuration. The global internetwork of networks, often referred to as the "Internet" with a capital "I," is one example of a TCP/IP (Transfer Control Protocol and Internet Protocol) network. It should be understood, however, that the disclosed embodiments may utilize any of various other types of networks.

User systems 850 may communicate with MTS 800 using TCP/IP and, at a higher network level, use other common Internet protocols to communicate, such as HTTP, FTP, AFS, WAP, etc. For example, where HTTP is used, user system 850 might include an HTTP client commonly referred to as a "browser" for sending and receiving HTTP messages from an HTTP server at MTS 800. Such a server might be implemented as the sole network interface between MTS 800 and network 840, but other techniques might be used as well or instead. In some implementations, the interface between MTS 800 and network 840 includes load sharing functionality, such as round-robin HTTP request distributors to balance loads and distribute incoming HTTP requests evenly over a plurality of servers.

In various embodiments, user systems 850 communicate with application servers 822 to request and update system-level and tenant-level data from MTS 800 that may require one or more queries to data storage 812. In some embodiments, MTS 800 automatically generates one or more SQL statements (the SQL query) designed to access the desired information. In some cases, user systems 850 may generate requests having a specific format corresponding to at least a portion of MTS 800. As an example, user systems 850 may request to move data objects into a particular environment 824 using an object notation that describes an object relationship mapping (e.g., a JavaScript object notation mapping) of the specified plurality of objects.

Exemplary Computer System

Figure 9:
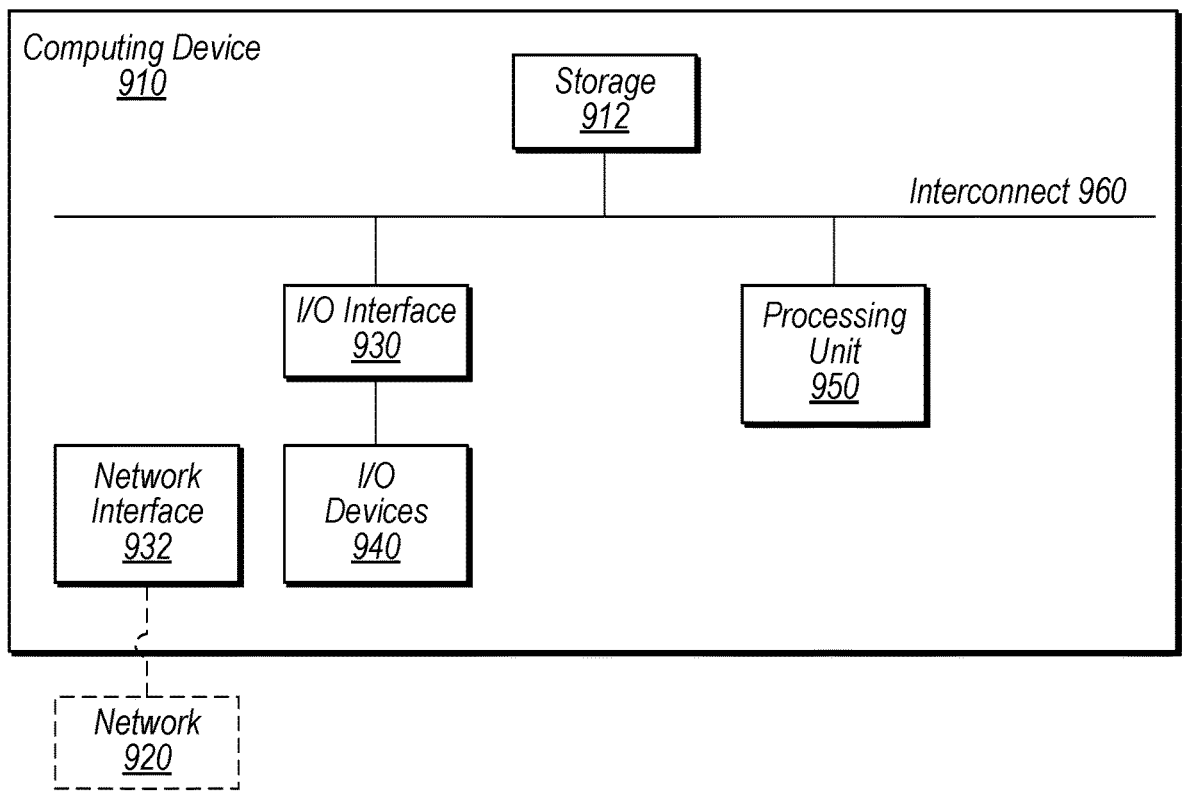
FIG. 9 is a block diagram illustrating elements of a computer system for implementing various systems described in the present disclosure.

Turning now to FIG. 9, a block diagram of an exemplary computer system 900, which may implement server computer system 110, database 150, MTS 800, and/or user system 850, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement transformation module 140 and transform tool 470 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over Wi-Fi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
    maintaining, by a server computer system, a logical name and a current physical name corresponding to an existing database object, wherein the logical name points to the current physical name of the existing database object such that the server computer system responds to read requests specifying the logical name using the existing database object;
    receiving, by the server computer system, a schema change request that specifies the logical name and one or more data format changes for the existing database object; and
    performing, by the server computer system in response to the schema change request, a schema change operation that includes:
        creating a new database object having a new physical name;
        copying existing data from the existing database object to the new database object while transforming the copied data according to the one or more data format changes specified in the schema change request; and
        after completing the copying, causing the logical name to point to the new physical name instead of the current physical name.

2. The method of claim 1, further comprising:
    after completing the schema change operation, responding, by the server computer system, to subsequent database queries specifying the logical name from the new database object.

3. The method of claim 1, wherein performing the schema change operation further includes:
    mirroring newly received writes directed to the logical name to both the existing database object and the new database object.

4. The method of claim 1, wherein the copying includes:
    recording, based on results of transforming the copied data according to the one or more data format changes, whether the transformation is committed; and
    performing, after completing the copying based on the recording, a repair process, wherein the repair process transforms copied data associated with recorded, uncommitted changes according to the one or more data format changes specified in the schema change request.

5. The method of claim 1, wherein performing the schema change operation further includes:
placing a lock on the existing database object, wherein the lock prevents additional schema change requests from altering a schema of the existing database object during the schema change operation; and
in response to completing the schema change operation, removing the lock from the existing database object.

6. The method of claim 1, wherein performing the schema change operation further includes:
generating, prior to the copying, a snapshot of the existing database object, wherein the copying existing data from the existing database object to the new database object is performed based on the data included in the snapshot of the existing database object.

7. The method of claim 1, further comprising:
responding, by the server computer system prior to completing the schema change operation, to database queries specifying the logical name from the existing database object, wherein database queries received during performance of the schema change operation and specifying the logical name are consistent with writes received during performance of the schema change operation.

8. The method of claim 1, further comprising:
storing, by the server computer system in a database object, metadata for a plurality of schema change operations performed on one or more existing database objects.

9. The method of claim 1, wherein performing the schema change operation further includes:
retrieving, from a catalog object stored in a database utilized by the server computer system to store the existing database object and the new database object, metadata for the existing database object, wherein the metadata specifies a physical name corresponding to a database object to which the logical name is currently pointing.

10. A non-transitory computer-readable medium having program instructions stored thereon that are capable of causing a computer system to perform operations comprising:
maintaining a logical name and a current physical name corresponding to an existing database object, wherein the logical name points to the current physical name of the existing database object, and wherein reads specifying the logical name are handled using data stored in the existing database object;
receiving a schema change request that specifies the logical name and one or more data format changes for the existing database object; and
performing, in response to the schema change request, a schema change operation that includes:
creating a new database object having a new physical name;
copying existing data from the existing database object to the new database object while transforming the copied data according to the one or more data format changes specified in the schema change request; and
after completing the copying, causing the logical name to point to the new physical name instead of the current physical name.

11. The non-transitory computer-readable medium of claim 10, wherein the operations further comprise:
after completing the schema change operation, responding to subsequent database queries specifying the logical name from the new database object.

12. The non-transitory computer-readable medium of claim 10, wherein the operations further comprise:
mirroring newly received writes directed to the logical name to both the existing database object and the new database object.

13. The non-transitory computer-readable medium of claim 10, wherein the copying includes:
recording, based on results of transforming the copied data according to the one or more data format changes, whether the transformation is committed; and
performing, after completing the copying, a repair process, wherein the repair process transforms copied data associated with recorded, uncommitted changes according to the one or more data format changes specified in the schema change request.

14. The-transitory computer-readable medium of claim 10, wherein performing the schema change operation further includes:
placing a lock on the existing database object, wherein the lock prevents additional schema change requests from altering a schema of the existing database object during the schema change operation; and
generating, prior to the copying, a snapshot of the existing database object, wherein copying existing data from the existing database object to the new database object is performed based on the data included in the snapshot of the existing database object.

15. The-transitory computer-readable medium of claim 10, wherein the operations further comprise:
responding, prior to completing the schema change operation, to database queries specifying the logical name from the existing database object, wherein the one or more data format changes include at least a primary key attribute change.

16. A system, comprising:
at least one processor; and
memory having program instructions stored thereon that are executable by the at least one processor to cause the system to perform operations comprising:
maintaining a logical name and a current physical name corresponding to an existing database object, wherein the logical name points to the current physical name of the existing database object such that read requests specifying the logical name are responded to using data stored in the existing database object;
receiving a schema change request that specifies the logical name and one or more data format changes for the existing database object; and
performing, in response to the schema change request, a schema change operation that includes:
creating a new database object having a new physical name;
copying existing data from the existing database object to the new database object while transforming the copied data according to the one or more data format changes specified in the schema change request; and
after completing the copying, causing the logical name to point to the new physical name instead of the current physical name.

17. The system of claim 16, wherein the instructions are further executable by the at least one processor to cause the system to perform additional operations comprising:

after completing the schema change operation, responding to subsequent database queries specifying the logical name from the new database object.

18. The system of claim 16, wherein the copying includes:
recording, based on results of transforming the copied data according to the one or more data format changes, whether the transformation is committed.

19. The system of claim 18, wherein the copying further includes:
performing, after completing the copying based on the recording, a repair process, wherein the repair process transforms copied data associated with recorded, uncommitted changes according to the one or more data format changes specified in the schema change request.

20. The system of claim 16, wherein performing the schema change operation further includes:
mirroring newly received writes directed to the logical name to both the existing database object and the new database object;
in response to detecting that at least one of the copying and the mirroring have failed during performance of the schema change operation, relaunching the schema change operation, wherein relaunching includes restarting the schema change operation for the existing database object; and
generating, prior to the copying, a snapshot of the existing database object, wherein copying existing data from the existing database object to the new database object is performed based on the data included in the snapshot of the existing database object.

\* \* \* \* \*

UNITED STATES PATENT AND TRADEMARK OFFICE
CERTIFICATE OF CORRECTION

PATENT NO. : 12,292,862 B2
APPLICATION NO. : 18/473819
DATED : May 6, 2025
INVENTOR(S) : Gokcen Iskender et al.

Page 1 of 1

It is certified that error appears in the above-identified patent and that said Letters Patent is hereby corrected as shown below:

In the Claims

In Column 26 (Claim 14), Line 19, please delete "The -transitory" and insert -- The non-transitory --.

In Column 26 (Claim 15), Line 31, please delete "The -transitory" and insert -- The non-transitory --.

Signed and Sealed this
First Day of July, 2025

Coke Morgan Stewart
*Acting Director of the United States Patent and Trademark Office*